United States Patent

[11] 3,557,851

| [72] | Inventor | Masato Tsutsumi<br>Kahului, Maui, Hawaii |
|---|---|---|
| [21] | Appl. No. | 824,730 |
| [22] | Filed | Apr. 30, 1969<br>Continuation of application Ser. No.<br>631,783, Apr. 18, 1967, now abandoned. |
| [45] | Patented | Jan. 26, 1971 |
| [73] | Assignee | Maui Land & Pineapple Company, Inc.<br>Kahului, Maui, Hawaii<br>a corporation of Hawaii |

[54] CUTTER FOR PINEAPPLE SEGMENTS
10 Claims, 7 Drawing Figs.

| [52] | U.S. Cl. | 146/6 |
|---|---|---|
| [51] | Int. Cl. | A23n 7/00 |
| [50] | Field of Search | 146/6, 160 |

[56] References Cited
UNITED STATES PATENTS

| 1,671,723 | 5/1928 | Jagenburg | 146/6 |
| 2,178,884 | 11/1939 | Thompson | 146/6X |
| 2,530,063 | 11/1950 | Jagenburg | 146/6 |
| 3,136,103 | 6/1964 | Farmer | |
| 3,236,276 | 2/1966 | Farmer | 146/6X |
| 3,136,348 | 6/1964 | Farmer | 146/6 |
| 3,246,678 | 4/1966 | Farmer | 146/6X |

*Primary Examiner*—Willie G. Abercrombie
*Attorney*—Lyon & Lyon

ABSTRACT: An axially reciprocating shell contains radial knives which cut annular slices of pineapple into segments. A rotary tubular knife projecting axially into the shell cuts each segment while the segmented slices are still within the shell. The diameter of the tubular knife employed determines whether the inner, outer, or intermediate portions of the segmented slices are cut. The shell is reciprocated by an eccentric mechanism, with the rotary support for the tubular knife being interposed between the eccentric mechanism and the shell

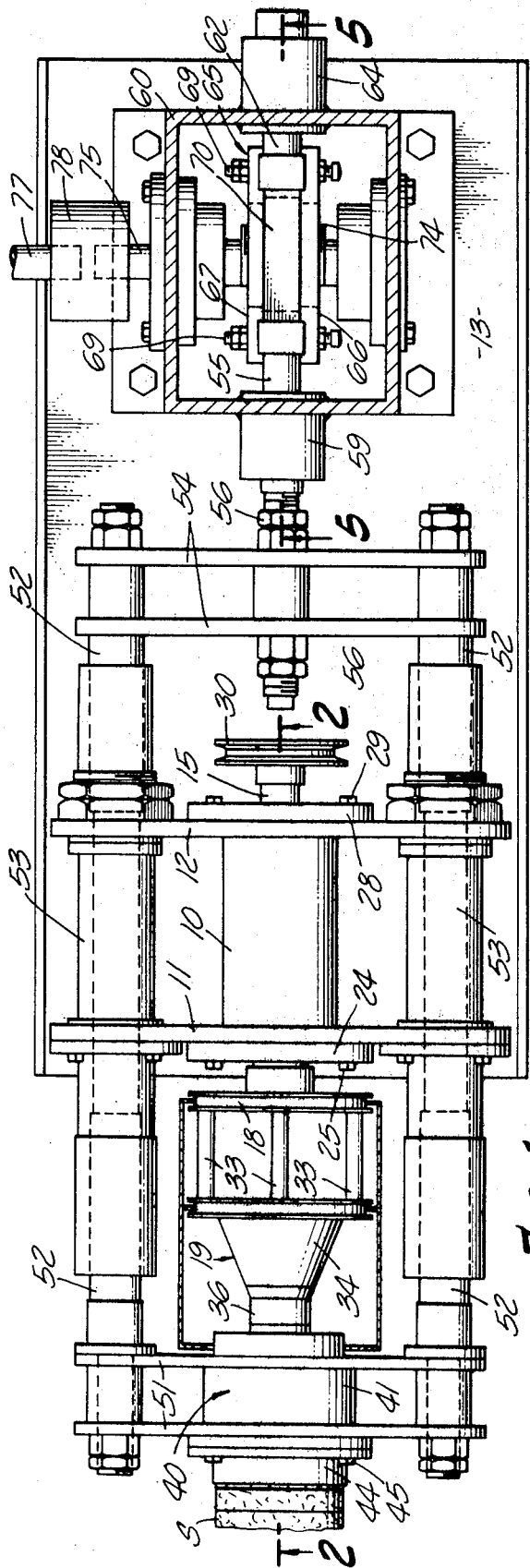
FIG. 1.
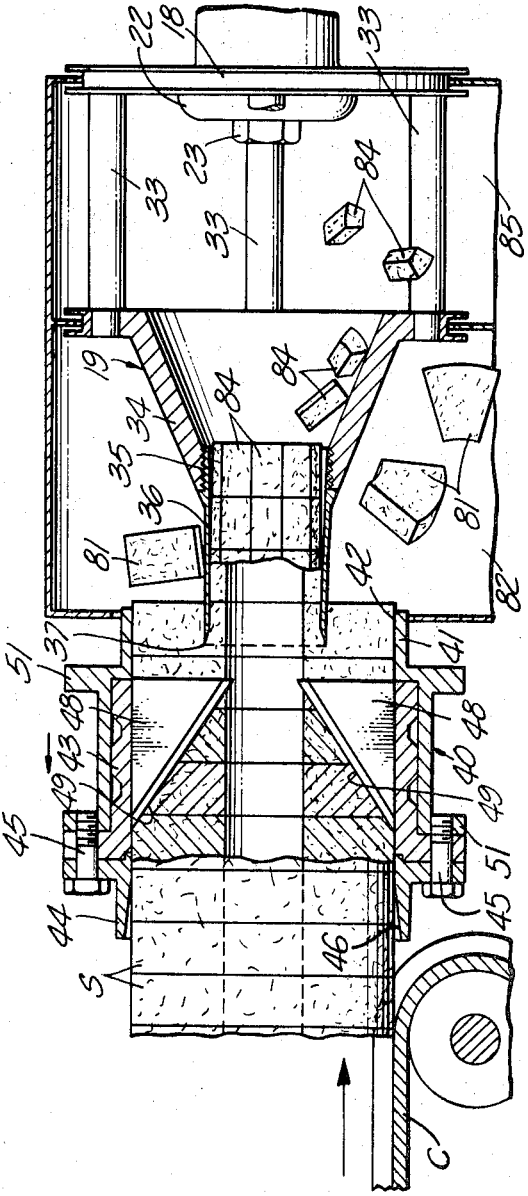
FIG. 4.
INVENTOR.
MASATO TSUTSUMI
BY
ATTORNEYS

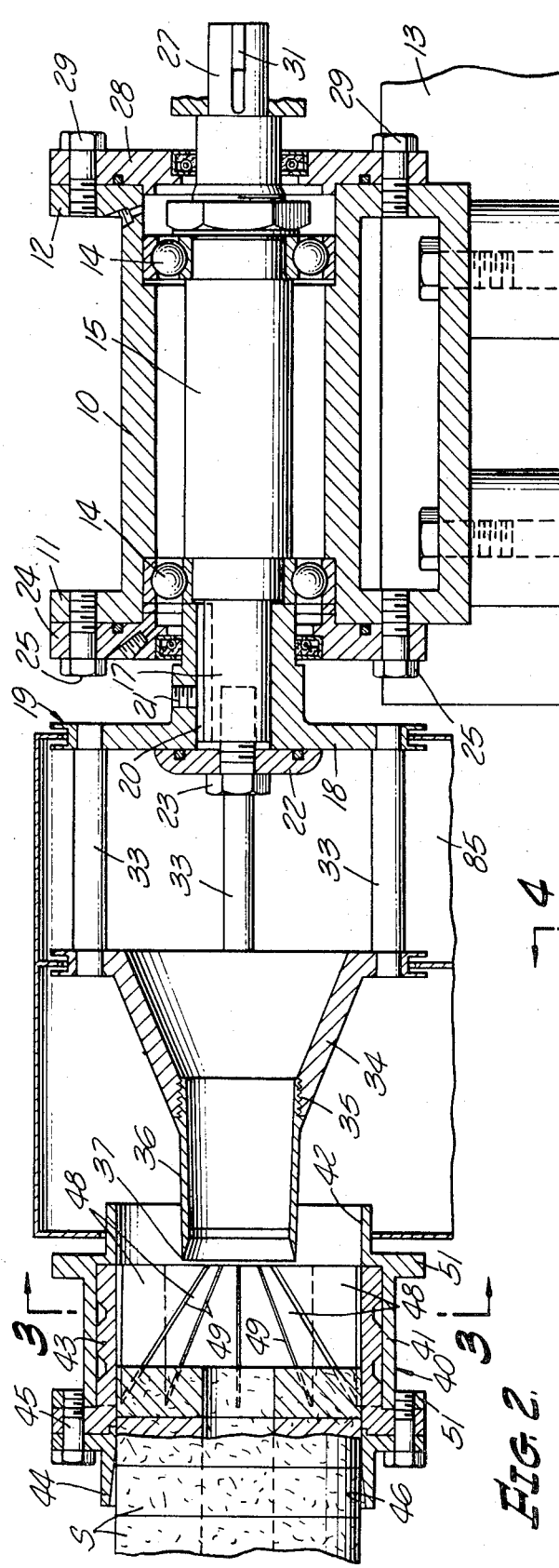
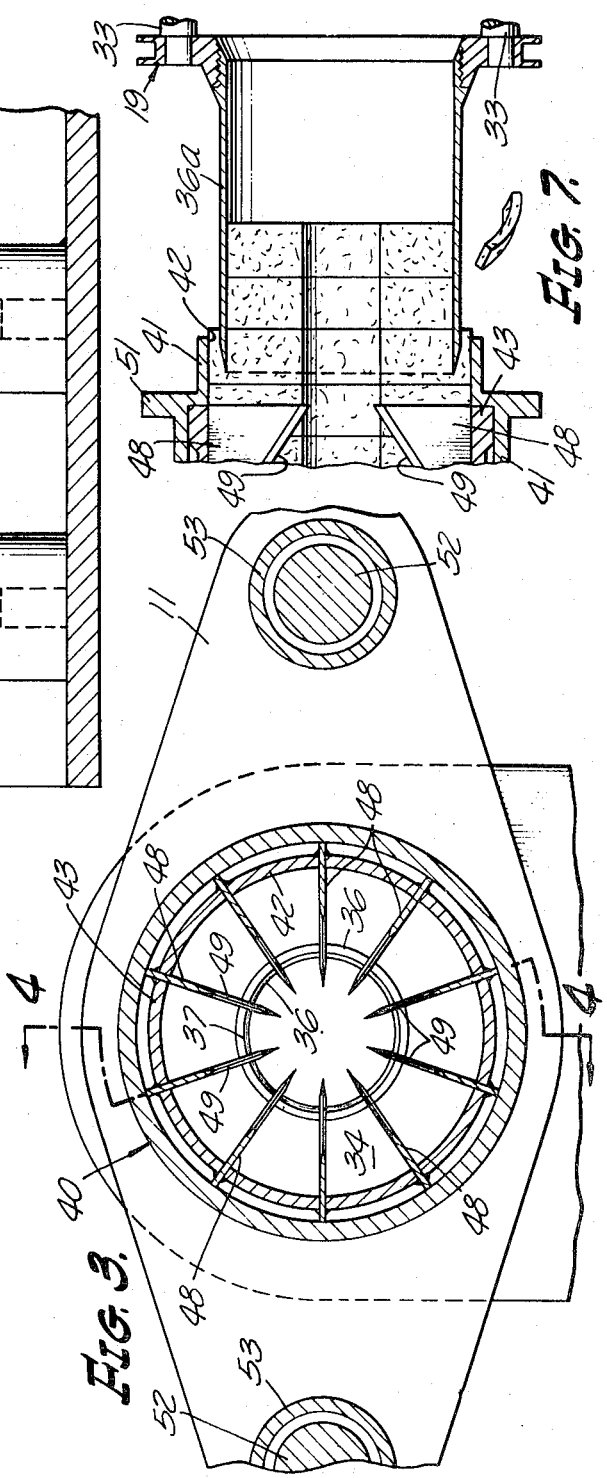
INVENTOR.
MASATO TSUTSUMI
BY
Lyon & Lyon
ATTORNEYS

CUTTER FOR PINEAPPLE SEGMENTS

This application is a continuation of Ser. No. 631,783, filed Apr. 18, 1967, now abandoned.

BACKGROUND OF THE INVENTION

This invention relates to apparatus for cutting annular slices of pineapple into segments and for cutting the segmented slices for recoring, resizing or cutting "cubes." A device of this type may be classified as a fruit corer and segmenter. Devices of this general type are shown in the U.S. Pat. to Kennedy Nos. 1,395,425, Taylor 1,670,084, and Jagenburg 1,671,723. While these prior art patents disclose various devices for cutting fruit, they do not disclose how annular fruit slices may first be cut into segments by an axially reciprocating group of knives and then each segmented slice trimmed interiorly or exteriorly or cut into cubes by a rotating tubular knife. Moreover, the patents fail to show how the rotary support for the tubular knife may be positioned intermediate the location of the group of segment-forming knives and the mechanism for axially reciprocating said knives.

SUMMARY

Briefly stated, this invention concerns a device for cutting annular slices of pineapple into segments and for cutting the segmented slices on an inner diameter for recoring or an outer diameter for resizing or in an intermediate position to form cubes. A reciprocating cutter assembly includes a shell having an axial bore through which annular slices of pineapple pass axially. Radial knives mounted in the bore of the shell cut the annular slices into segments. While the cut segments are still within the bore of the shell, a tubular rotating knife cuts each segment axially. The inner portions of the cut segments pass through the interior of the tubular rotating knife and the outer portions pass exteriorly of the rotating knife and are collected separately. The rotary support for the tubular knife is positioned between the reciprocating shell and a power-driven eccentric mechanism for reciprocating the shell and its blades.

BRIEF DESCRIPTION OF THE DRAWINGS

FIG. 1 is a top plan view partly in section showing a preferred embodiment of this invention;

FIG. 2 is a sectional elevation partly broken away taken substantially on the lines 2–2 as shown on FIG. 1;

FIG. 3 is a transverse sectional detail taken substantially on the lines 3–3 as shown on FIG. 2;

FIG. 4 is a sectional side elevation taken substantially on the lines 4–4 as shown on FIG. 3;

FIG. 7 is a sectional detail similar to a portion of FIG. 4 showing a larger diameter tubular knife for resizing.

DESCRIPTION OF THE PREFERRED EMBODIMENT

Figure 5:
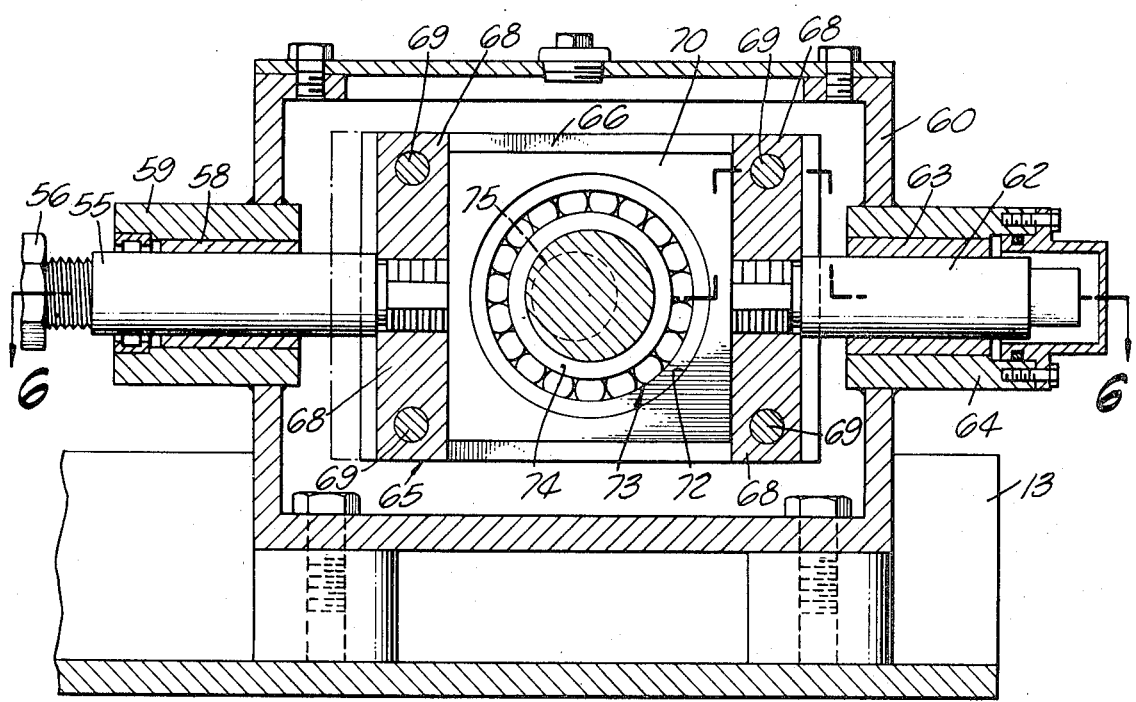
FIG. 5 is a sectional elevation taken substantially on the lines 5–5 as shown on FIG. 1.

The stationary housing 10 is provided with integral end flanges 11 and 12 which project laterally therefrom. The housing 10 is mounted on a suitable frame or base 13. Axially spaced bearings 14 are mounted in the housing 10 and support the rotary shaft 15.

Both ends of the shaft 15 project from the housing 10. On the overhanging end 17 of the shaft 15 there is mounted the hub 18 of a rotary spider generally designated 19. A key 20, setscrew 21, plate 22 and threaded retainer 23 serve to fix the rotary spider 19 concentrically on the overhanging end 17 of the rotary shaft 15. The hub 18 is a portion which projects within the annular end plate 24 which is attached to the housing by means of fastenings 25.

The overhanging end 27 of the shaft 15 projects through the annular end plate 28 fixed to the housing by means of the threaded fastenings 29. A pulley 30 is belt driven from a power source (not shown) and this pulley is fixed to the overhanging portion 27 of the shaft 15 by means of the key 31.

The spider 19 includes a plurality of circumferentially spaced parallel rods 33 extending between the flanged hub 18 and the hollow cone element 34. This cone element 34 is connected by threads 35 to one end of the tubular knife 36, and the other end of the knife 36 has a circular cutting edge 37. The tubular knife 36 is mounted to rotate about the axis of the rotary shaft 15. A nonrotary cutter assembly 40 includes a shell 41 having an axial bore 42. The shell 41 is constructed of several parts which operate as a single unit. These parts include the blade carrier 43, the entry ring 44, and the threaded fastenings 45 which connect these parts. The blade carrier 43 and the entry ring 44 contain a portion of the axial cylindrical bore 42, and this bore is flared as shown at 46 within the entry ring 44. Radial cutting blades 48 are fixed within the blade carrier 43, and each of these blades has a sharp leading edge 49 which extends at an angle from a bore 42 to a position adjacent the circular cutting edge 37 of the rotary knife 36. The cutting edge 37 has a larger diameter than the diameter defined by the inner trailing ends of the blades 48.

The cutter assembly 40 has parallel flanges 51 which extend laterally therefrom and which are fixed on the forward ends of parallel guide bars 52. These guide bars are slidably mounted within parallel stationary sleeves 53 supported on the housing flanges 11 and 12. The guide bars 52 are thus slidably supported for reciprocating movement parallel to the axis of the rotary shaft 15. Parallel plates 54 are fixed to the other ends of the guide bars 52 and the central portions of these plates 54 are in turn fixed to the axially reciprocable rod 55. This rod 55 is exteriorly threaded for engagement with the adjusting nuts 56 so that the axial position of the rod 55 and the plate 54 may be adjusted and then fixed in adjusted position.

Figure 6:
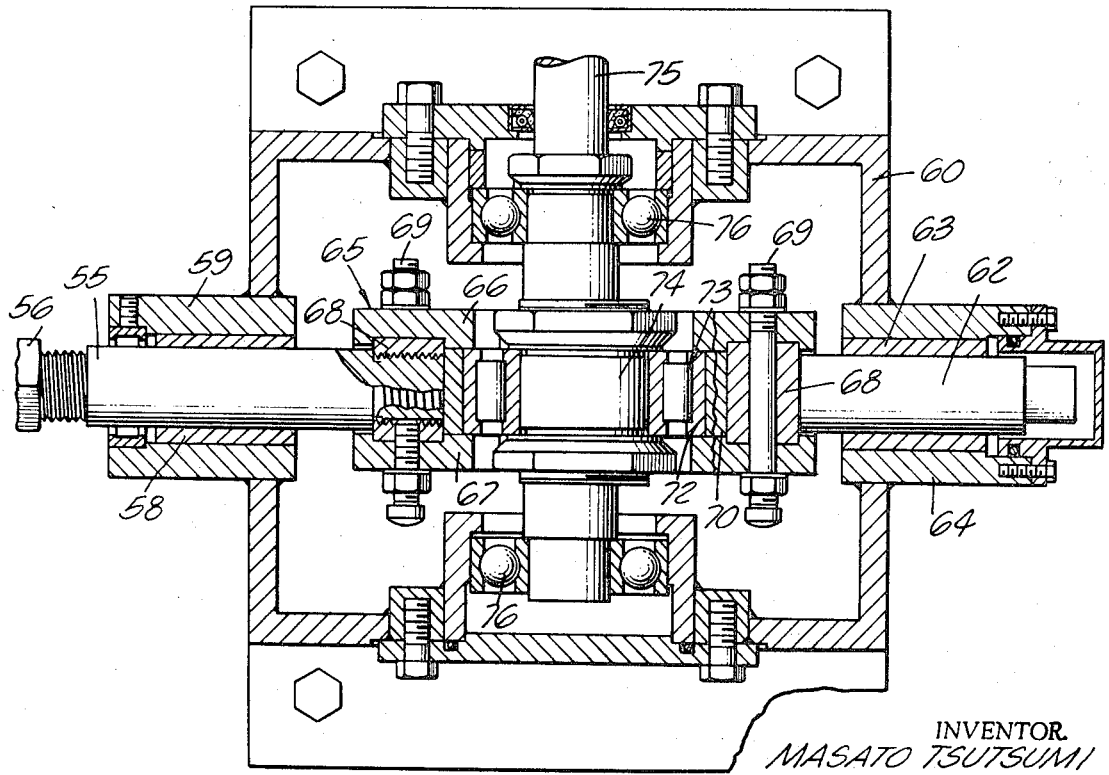
FIG. 6 is a sectional plan view taken substantially on the lines 6–6 as shown on FIG. 5.

As best shown in FIGS. 5 and 6, the rod 55 is mounted for axial sliding movement within a bushing 58 carried in a sleeve 59. This sleeve 59 is a part of the outer stationary body 60 which is carried on the base or frame 13. A rod 62 is mounted coaxially with the rod 55 and mounted to slide within bushing 63 carried in body sleeve 64. The coaxial rods 55 and 62 are each fixed to the cross head generally designated 65. This crosshead 65 comprises a pair of generally rectangular plates 66 and 67 separated by spacers 68 and connected by through bolts 69. A slide block 70 is guided for vertical movement between the spacers 68 and this slide block has a circular opening 72 for reception of the outer race of the bearing assembly 73. The inner race of this bearing assembly 73 is mounted on the eccentric portion 74 of the transverse shaft 75. This shaft is rotatably supported in axially spaced bearings 76 carried on the body 60. As shown diagrammatically in FIG. 1, the shaft 75 is driven from a power shaft 77 by means of a coupling 78.

From this description it will be understood that when the shaft 75 is turned, the eccentric portion 74 causes the block 70 to move up and down within the crosshead 65, while the crosshead 65 is reciprocated axially lengthwise of the rods 55 and 62. This reciprocation of the rod 55 is communicated to the guide bars 52 through the plates 54, and the cutter assembly 40 carried by the guide bars is also reciprocated axially. The degree of axial reciprocation is determined by the degree of eccentricity of the eccentric portion 74 of the cross shaft 75.

It will be observed that the housing 10 and shaft 15 for rotatably supporting the tubular knife 36 are physically interposed between the body 60 containing the eccentric mechanism and the reciprocating cutter assembly 40. In this way, both the rotating tubular knife 36 and the nonrotary cutter assembly 40 are positioned at the end of a conveyor for annular pineapple slices, without requiring any space along the conveyor line for rotatably supporting the tubular knife 36 or for mechanism to reciprocate the cutter assembly 40.

In operation, annular pineapple slices S which have previously been sized and cored are moved by conventional conveyor equipment C into the inlet ring 44 and into the cylindrical bore 42 of the cutter assembly 40. This cutter assembly 40 does not rotate but it reciprocates axially, as previously described. The slices S pass through the slanted radial knives 48 and continue to pass through the bore 42 in the shell 41 after the knives 48 have cut each annular slice into segments. The cutting edge 37 on the rotating tubular knife 36 projects into the shell 41, and it is of larger diameter than the existing holes in the center of the annular slices S. Accordingly, the rotating tubular knife 36 enlarges the hole in each of the segmented slices before they emerge from the shell 41, when the diameter of the rotary knife 36 is slightly larger than the diameter of the existing core holes in the slices S, as shown in the drawings. The segments 81 pass outside the rotary knife 36 into the chamber 82 defined within the stationary casing 83. The small portions 84 of pineapple cut from the inner ends of the segments 81 by the rotary knife 36 pass through the interior of the knife 36 and through the hollow cone member 34 and pass outward through spaces between the bars 33 into the chamber 85. If it is desired to resize the slices to trim a portion of the outer periphery to remove blemishes, a large diameter rotary knife 36a is employed, as shown in FIG. 7. If it is desired to cut the segmented slices into cubes, a rotary knife of intermediate diameter is employed.

Having fully described my invention, it is to be understood that I am not to be limited to the details herein set forth, but that my invention is of the full scope of the appended claims.

I claim:

1. Apparatus for cutting annular slices of pineapple into segments and for axially cutting the segmented slices, comprising in combination: a nonrotary cutter assembly having a shell provided with an axial bore for sliding reception of annular slices of pineapple, a plurality of knives mounted therein, a rotary tubular knife having one end provided with a circular cutting edge and projecting axially into said shell, a rotary member connected at the other end of the tubular knife for supporting it for axial rotation, means for turning said rotary member, and means for axially reciprocating said cutter assembly, the latter said means including reciprocating mechanism positioned adjacent to the turning means for the rotary member and remote from said shell.

2. The combination of claim 1 wherein the knives in the cutter assembly extend within a diameter smaller than the diameter of the circular cutting edge of the rotary tubular knife.

3. The combination of claim 1 wherein each knife in the cutter assembly extends radially inward from the shell bore at an angle.

4. Apparatus for cutting annular slices of pineapple into segments and for axially cutting the segmented slices, comprising in combination: a nonrotary assembly having a shell provided with an axial bore for sliding reception of annular slices of pineapple, a plurality of knives mounted therein, a rotary tubular knife having one end provided with a circular cutting edge and projecting axially into said shell, a rotary spider connected at the other end of the rotary tubular knife for supporting it for axial rotation, the spider having openings between the ends thereof, means for turning said rotary spider, and means for axially reciprocating said cutter, assembly, whereby cut segmental parts from the outer portions of the annular slices pass outside the rotary tubular knife and whereby cut segmental parts from the inner portions of the annular slices pass axially through the interior of the rotary tubular knife and radially outward through the spider openings.

5. The combination of claim 4 wherein the rotary spider is carried on the overhanging end of a driving shaft supported in axially spaced bearings.

6. Apparatus for cutting annular slices of pineapple into segments and for axially cutting the segmented slices, comprising in combination: a rotary tubular knife having one end provided with a circular cutting edge, a rotary member connected at the other end of the rotary tubular knife for supporting it for axial rotation, a housing and a pair of axially spaced bearings therein rotatably supporting said rotary member and rotary tubular knife outboard of said bearings, power means for turning said rotary member, guide bars parallel to the axis of rotation straddling said rotary member, a nonrotary cutter assembly having a plurality of radiating knives, said assembly being carried on said guide bars adjacent to and coaxial with said rotary tubular knife, and means adjacent said power means remote from said rotary tubular knife for axially reciprocating said guide bars and cutter assembly.

7. The combination of claim 6 wherein the reciprocating means includes a power-driven eccentric, and a follower driven thereby and operatively connected to said guide bars.

8. Apparatus for cutting annular slices of pineapple into segments, comprising in combination: a shell having an axial bore through which a series of aligned annular slices of pineapple in face-to-face contact may be slidably received, conveyor means for transporting said annular slices axially to said shell and moving them through said axial bore, a plurality of radiating knives fixed within said shell, each knife extending inward from the shell bore at an angle, said shell bore extending axially beyond the knives at the entry end of the bore, guide bars parallel to the axial bore outside said shell, means fixing the shell to said guide bars, and power means spaced axially from said shell for reciprocating said guide bars and shell axially during movement of the pineapple slices through said bore.

9. Apparatus for cutting annular slices of pineapple into segments, comprising in combination: a shell having an axial bore through which a series of aligned annular slices of pineapple in face-to-face contact may be slidably received, conveyor means for transporting said annular slices axially to said shell and moving them through said axial bore, said shell bore extending axially beyond the knives of at the entry end of the bore, guide bars parallel to the axial bore outside said shell, means fixing the shell to said guide bars, and means including a power driven eccentric and follower spaced axially from said shell for reciprocating said guide bars and shell during movement of the pineapple slices through said bore.

10. Apparatus for cutting annular slices of pineapple into segments, comprising in combination: a shell having an axial bore and a plurality of radiating knives fixed therein, conveyor means for transporting aligned annular slices of pineapple in face-to-face relation axially to said shell and for moving them through said axial bore, guide bars parallel to the axial bore outside said shell, means fixing the shell to said guide bars bearing sleeves slidably supporting said guide bars, and means including a power-driven eccentric and follower remote from said shell for reciprocating said guide bars during movement of the pineapple slices through said bore.